United States Patent
Skinner et al.

(10) Patent No.: US 7,193,388 B1
(45) Date of Patent: Mar. 20, 2007

(54) OFFSET PWM SIGNALS FOR MULTIPHASE MOTOR

(75) Inventors: James L. Skinner, Collinsville, IL (US); Charles E. B. Green, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 11/346,027

(22) Filed: Feb. 2, 2006

(51) Int. Cl.
*H02P 11/00* (2006.01)

(52) U.S. Cl. .................. 318/811; 318/810; 318/807

(58) Field of Classification Search ............. 318/811, 318/810, 807
See application file for complete search history.

(56) References Cited

U.S. PATENT DOCUMENTS

| | | | |
|---|---|---|---|
| 4,772,996 A * | 9/1988 | Hanei et al. ............... | 363/41 |
| 5,023,537 A | 6/1991 | Baits ........................ | 318/732 |
| 5,245,525 A | 9/1993 | Galloway et al. .......... | 363/71 |
| 5,337,013 A | 8/1994 | Langer et al. ............. | 324/537 |
| 5,627,445 A | 5/1997 | Webster .................... | 318/701 |
| 5,793,169 A | 8/1998 | De Filippis et al. ....... | 318/254 |
| 5,874,818 A * | 2/1999 | Schuurman ................ | 318/439 |
| 5,977,741 A | 11/1999 | DeLange et al. ........... | 318/801 |
| 6,104,149 A | 8/2000 | Pelly ........................ | 318/254 |
| 6,456,946 B1 * | 9/2002 | O'Gorman ................. | 702/58 |
| 6,556,464 B2 * | 4/2003 | Sakai et al. ............... | 363/132 |
| 6,642,690 B2 | 11/2003 | Kim .......................... | 318/811 |
| 6,735,537 B2 * | 5/2004 | Liu et al. ................... | 702/64 |
| 6,795,323 B2 | 9/2004 | Tanaka et al. ............. | 363/41 |
| 6,801,005 B2 | 10/2004 | Charleston ................ | 318/438 |
| 6,804,130 B2 | 10/2004 | Morimoto .................. | 363/132 |
| 6,807,074 B2 | 10/2004 | Ollila et al. ............... | 363/41 |
| 6,864,649 B2 | 3/2005 | Krueger .................... | 318/254 |
| 6,911,801 B2 | 6/2005 | Youm ........................ | 318/801 |
| 6,914,409 B2 | 7/2005 | Nukushina ................. | 318/800 |
| 7,049,778 B2 * | 5/2006 | Katanaya .................. | 318/599 |
| 7,064,514 B2 * | 6/2006 | Iwaji et al. ................ | 318/801 |
| 7,119,530 B2 * | 10/2006 | Mir et al. .................. | 324/76.15 |
| 2004/0227476 A1 | 11/2004 | Guerra et al. ............. | 318/254 |
| 2005/0017760 A1 | 1/2005 | Grasso et al. ............. | 327/50 |
| 2005/0174076 A1 * | 8/2005 | Katanaya .................. | 318/254 |
| 2005/0225275 A1 | 10/2005 | Eskritt et al. ............. | 318/437 |
| 2005/0231146 A1 | 10/2005 | De Frutos et al. ......... | 318/434 |
| 2006/0113948 A1 * | 6/2006 | Kaneko et al. ............ | 318/716 |

FOREIGN PATENT DOCUMENTS

| WO | WO 03/017463 A1 | 2/2003 |
|---|---|---|
| WO | WO 03/084044 A2 | 10/2003 |
| WO | WO 2005/067552 A2 | 7/2005 |

* cited by examiner

*Primary Examiner*—Rita Leykin
(74) *Attorney, Agent, or Firm*—Senniger Powers

(57) ABSTRACT

A multi phase motor includes a switching array for interconnecting a power source to each phase. A current sensor senses current supplied from the power source via the switching array to the winding and a controller generates offset PWM signals for controlling the switching array to supply power to each of the phases of the winding. The offset timing allows the individual phase currents to be determined from a single current sensor.

21 Claims, 3 Drawing Sheets

OFFSET PWM SIGNALS FOR MULTIPHASE MOTOR

FIELD OF THE INVENTION

The present invention generally relates to current sensing in multiphase motors and, in particular, using a single current sensor for sensing current in each phase of a multiphase motor drive.

BACKGROUND OF THE INVENTION

Three current sensors are normally needed to measure the currents in each phase of a three phase motor. Many control methods and systems for commutating the switches which selectively supply power to each of the three phases of a motor require three signals, one from each of the three current sensors in each phase, for operation. Some control methods and systems employ the signal from a current sensor connected to a bus supplying current to the three phases. The cost of the sensors and the related conditioning circuitry associated with each sensor adds cost to the motor drive. The sensors also take up additional space thereby making the overall size of the drive circuitry of the motor larger.

Single current sensors are used in six step drives for three phase motors when individual phase current information is not needed. If individual phase current information is needed, more complex control methods and systems are employed.

As another example, U.S. Pat. No. 6,642,690 discloses modifying PWM signals in one cycle to allow for measurement of the current in a particular phase. After measurement, the PWM signals are again modified to correct for any distortion caused by the first modification during which the current was measured. As another example, U.S. Pat. No. 6,735,537 suggests a procedure for measuring the current in each phase of a three phase motor via a single sensor by shifting the drive signals applied to windings for individual phases only for specific cases of signal overlap to allow separating individual phase currents. As another example, U.S. Pat. No. 6,914,409 relates to a current detection method which varies the offset of phase drive signals to allow separating each phase current from the combined current signal. The offset varies depending on the particular duty cycle of the PWM phase signals. In summary, such current sensing tends to dynamically shift the drive signals in real time.

SUMMARY OF THE INVENTION

In one form, the invention is an apparatus for supplying current from a power source to each phase of a multi-phase motor. One or more switching arrays interconnect the power source and each phase of the multi-phase motor. One or more current sensors sense current supplied from the power source via the switching array to the motor. A controller generates pulse width modulated (PWM) signals for controlling the switching array(s) to supply power to each of the phases of the motor. The PWM signals supplied by the controller to the switching array(s) to supply power to each of the phases is offset a preset amount from the PWM signals supplied by the controller to the switching array to supply power to the other phases.

In one embodiment, the offset timing allows the individual phase currents to be determined from a single current sensor.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
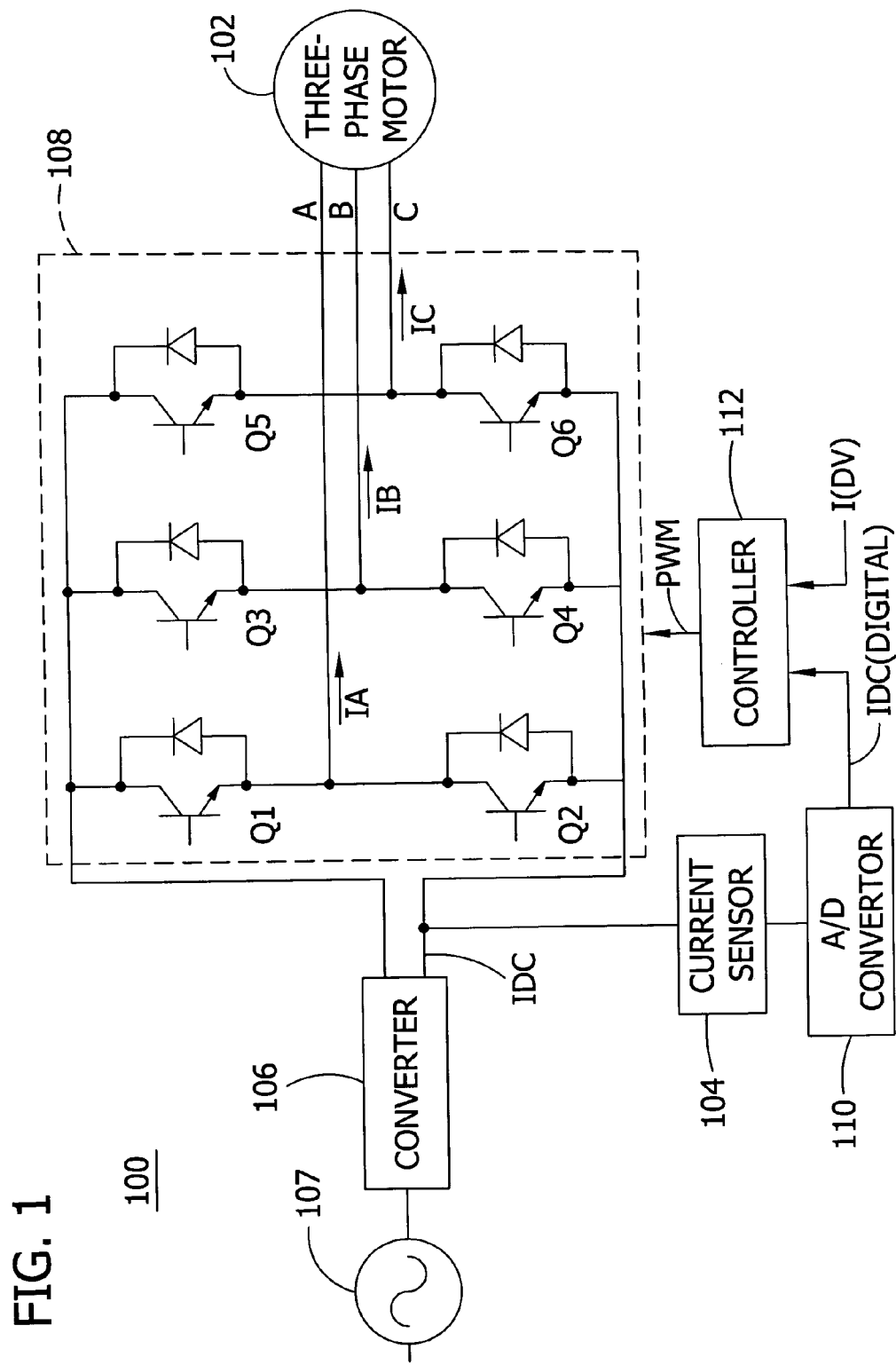
FIG. 1 is a diagram partially in block form and partially in schematic form of an apparatus according to one embodiment of the invention for supplying current to each phase of three-phase motor using a single current sensor.

The present invention is illustrated in one embodiment in FIG. 1, which is a diagram partially in block form and partially in schematic form showing an apparatus 100 for supplying current to each phase of multiphase alternating current motor such as a three phase motor 102 using a single current sensor 104. The apparatus 100 includes a converter 106 for converting alternating current from a three-phase AC (Alternating Current) power source 107 into direct current used to power a three phase motor 102. An inverter 108 comprises a switching array including a pair of switching devices Q1 and Q2, a pair of switching devices Q3 and Q4, and a pair of switching devices Q5 and Q6 for supplying power to the respective phases. Generally, either the upper or lower switch for a given phase is always on, except for brief periods during switching. The inverter 108 converts direct current from the converter 106 into alternating current and provides the alternating current to the three-phase motor 102. A current sensor 104 such as a shunt or other current sensing device or circuit measures current that flows through a bus line from the converter 106 or source 107 to the inverter 108. An analog-to digital (A/D) converter 110 periodically samples and converts an analog direct current value measured by the current sensor 104 into a digital current signal IDC (DIGITAL). A controller 112 generates a pulse width modulated (PWM) signal on the basis of the digital current signal from the A/D converter 110, to thus control switching of the switching devices Q1 and Q2, the switching devices Q3 and Q4, and the switching devices Q5 and Q6 in the respective phases.

The PWM signals for each of the three phases are offset a preset amount from each other. This allows periods of time that each phase can be sampled by a single current sensor. Whether a phase is HIGH or LOW depends on convention and definition. In one view, a particular phase is considered to be "HIGH" (or "on") when a HIGH PWM pulse is applied to the switch between the particular phase and the positive DC line so that the switch is closed and conducting. A particular phase is considered to be "LOW" (or "off") when a LOW PWM pulse is applied to the switch between the particular phase and the positive DC line so that the switch is an open circuit.

By offsetting the PWM signals in the three phases of the motor 102, the three currents IA, IB and IC can be measured or derived from the single current sensor 104. Without an offset, all PWM pulses could start and be "HIGH" (or "on") at the same time, could start and be "LOW" (or "off") at the same time, or could be too close to one another, so that sampling current from the current sensor would not indicate the current in a particular phase. Offsetting the starting times of the PWM streams results in predictable, known periods of time when the current flowing through the single current sensor 104 is the current in a particular motor phase or phases. Over a PWM cycle this occurs at a different time for each of the motor phases.

In one embodiment, sampling may occur at the center of the PWM pulses. In one embodiment, sampling may occur as a time which is a function of the leading edge, the trailing edge or the center of the PWM pulses. In one embodiment, the sampling is programmed to occur at times when no switching is occurring in any of the motor phases. Since the amplitude applied to each winding in response to the PWM pulse may vary sinusoidally with time (and be 120° offset), even during 100% duty cycles for a phase, there are known periods of time when the switches of other motor phases are such that individual phase currents can be sampled.

In operation, the apparatus 100 uses the single current sensor 104 according to one embodiment of the invention to monitor the current in each phase of the motor 102. However, it is contemplated that more than one current sensor may be used as part of the invention. The converter 106 receives the three-phase alternating current from the three-phase current power source 107 and outputs to the inverter 108 direct current after rectifying and smoothing. The inverter 108 converts the direct current into alternating current and outputs the alternating current to the three-phase motor 102. The value of the direct current that flows between the converter 106 and the inverter 108 (e.g., flows through a direct current link) is measured using the current sensor 104. The measured analog direct current value is sampled and converted to digital data using the A/D converter 110 which provides a corresponding digital current signal that is output to the controller 112.

In one embodiment, the PWM signal is a rectangular wave for turning on or turning off the switch devices Q1–Q6 of the inverter to commutate each corresponding phase. The switching devices Q1–Q6 of the inverter 108 are turned on or closed when the pulse width modulated (PWM) square wave signal is at a high level and are turned off or opened when the PWM square wave signal is at a low level.

Figure 2:
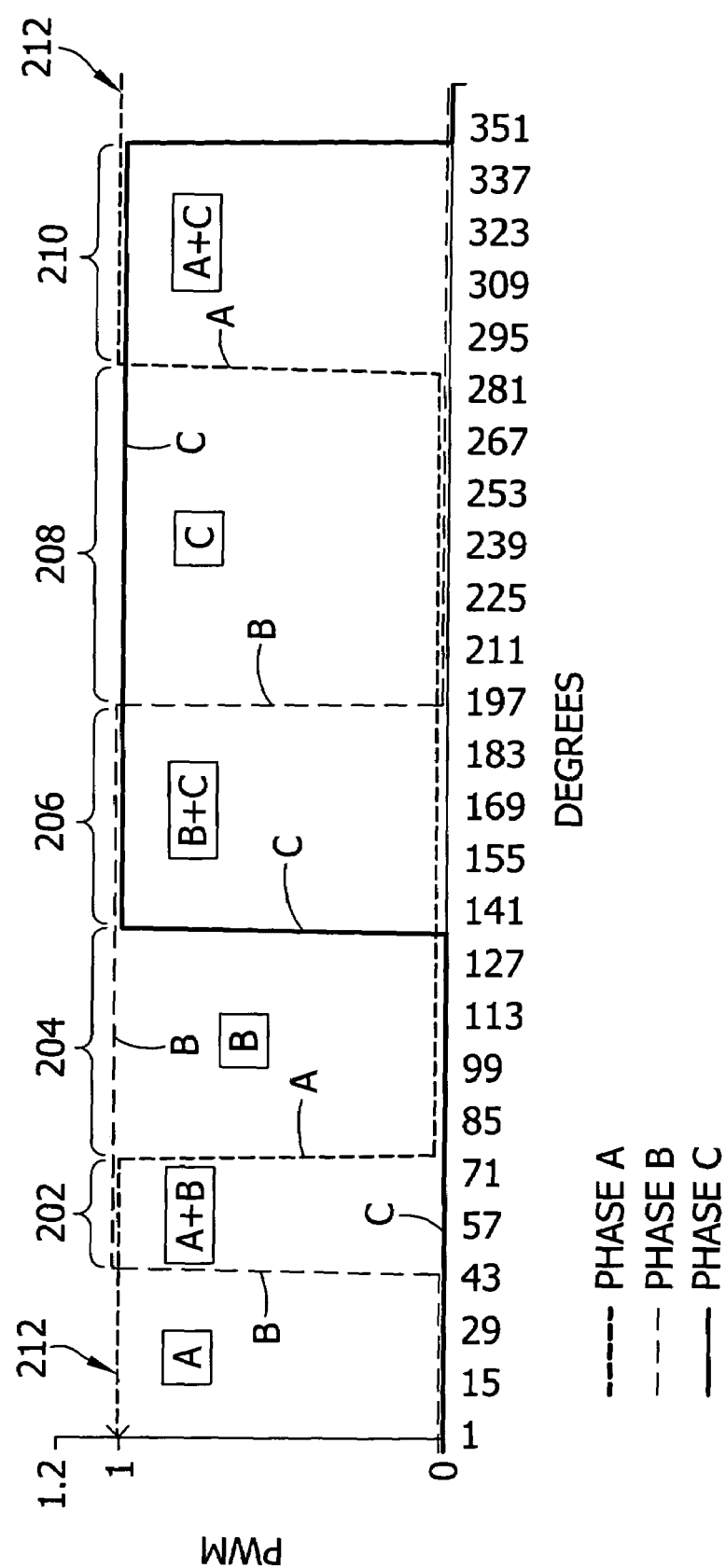
FIG. 2 is a timing diagram of the phase of PWM signals of a three phase motor according to one embodiment of the invention wherein motor phases A and B have a 42% duty cycle (e.g., operating during 150 degrees of a PWM cycle) and motor phase C has a 58% duty cycle (e.g., operating at 210 degrees of a PWM cycle). These duty cycles are simply examples for illustrative purposes.
Figure 3:
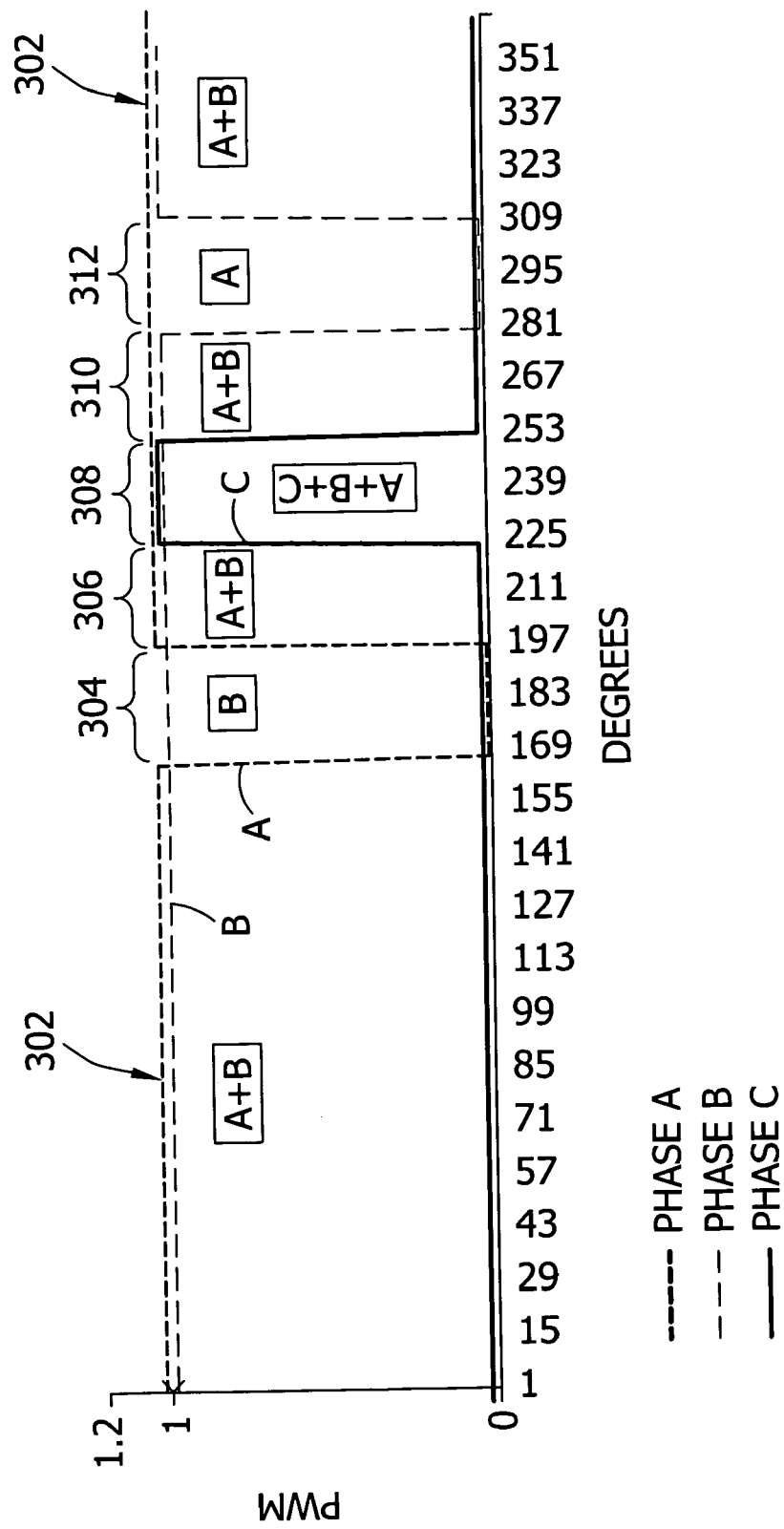
FIG. 3 is a timing diagram of the phase of PWM signals of a three phase motor according to one embodiment of the invention wherein motor phases A and B have a 92% duty cycle (e.g., operating during 330 degrees of a PWM cycle) and motor phase C has a 8% duty cycle (e.g., operating at 30 degrees of a PWM cycle). These duty cycles are simply examples for illustrative purposes.

In one embodiment, the current sensor 104 is a shunt which measures the current IDC and outputs the measured value as an analog signal to the A/D converter 110. The controller 112 determines the values of the currents IA, IB, and IC of the respective phases on the basis of the digital current signal from the A/D converter 110 and on the basis that the PWM signals for each of the three phases are offset a preset amount from each other. Although the converter 110 is illustrated as a separate component from the controller 112, it is contemplated that the controller 112 may have an integral converter For example, in one embodiment as illustrated in FIGS. 2 and 3, an offset of approximately 120° between each of the three phases may be implemented by the controller 112. The magnitude of the offset may be a function of or synchronized with the 120° offset frequently employed between the phases of the motor windings or synchronized with the frequency of the PWM signals. FIG. 2 is a timing diagram of the phase of PWM signals of a three phase motor according to one embodiment of the invention wherein motor phases A and B have, for example, a 42% duty cycle (e.g., operating during 150 degrees of a PWM cycle) and motor phase C has a 58% duty cycle (e.g., operating at 210 degrees of a PWM cycle). During time period 202, phases A and B are HIGH (e.g., shown in the box) and C is LOW so that the controller would receive the digital current signal from the A/D converter 110 to measure the total current in phase C. In a three phase motor, the single phase that has a status (either HIGH or LOW) different from the other two phases is the phase that is measured. For example, during time period 202, A and B are HIGH so C is the single phase having a status (LOW) which is different form the other two phases (A and B are HIGH) so that the current in C is measured. Alternatively, or in addition, the controller may signal the A/D converter 110 to sample the analog current signal from current sensor 104.

In FIGS. 2 and 3, the phase or phases in the box indicate the phase or phases which are HIGH. During time period 204, phase B is HIGH (e.g., shown in the box) and phases A and C are LOW so that the current sensor 104 and A/D converter 110 would indicate a measurement of the total current in phase B. Similarly, during time period 206, A is LOW and measured since B and C have the same HIGH status, during time period 208 A and B are LOW so that C has a singular HIGH status and is measured, during time period 210 B is LOW and measured since A and C have the same HIGH status and during time period 212 B and C are LOW and A has a singular high status and is measured.

FIG. 3 is a timing diagram of the phase of PWM signals of a three phase motor according to one embodiment of the invention wherein motor phases A and B have a 92% duty cycle (e.g., operating during 330 degrees of a PWM cycle) and motor phase C has a 8% duty cycle (e.g., operating at 30 degrees of a PWM cycle). During time period 302, phases A and B are HIGH so that phase C is LOW and measured, during time period 304 A and C are LOW so that B is HIGH and measured, during time period 306 A and B are HIGH so that C is LOW and measured, during time period 308 all phases A, B and C are HIGH so no measurements are taken (or the measurement would indicate total current in all three phases), during time period 310 A and B are HIGH so that C is LOW and measured and during time period 312 B and C are LOW so that A is HIGH and measured.

In certain cases of an n-phase motor, the controller may not be able to determine the current for a particular phase because the particular phase is never HIGH (or LOW) by itself and thus cannot be sampled. However, by measuring the current in the other n−1 phases, the current in the particular phase can be reconstructed. For example, for an n-phase motor the controller would measure current during a period when all of the n−1 phases other than the particular phase are HIGH. By knowing that the total current is zero and by knowing the current in n−1 phases, the controller reconstructs the current for the particular phase as a function of the determined current in the n−1 phases and as a function of the total current. For example, for a three phase motor it would measure current during a period when the two phases are HIGH (or LOW). By knowing that the total current is zero and by knowing the current in two of the phases, the controller reconstructs the current for the third phase as a function of the determined current in the two phases and as a function of the total current. FIG. 3 does not require reconstruction. Reconstruction is only needed when one phase cannot be sampled.

In one embodiment, depending on waveform configurations and commutation scenarios, for PWM duty cycles in which the pulses are less than 240 degrees, each phase can be sampled individually and separately. Above 240 degree, pairs of phase currents can be sampled to provide the following information which can be solved to reconstruct the individual currents IA, IB and IC:

IA+IB=Sample 1;

IB+IC=Sample 2; and

IC+IA=Sample 3.

An offset of 120° according to one embodiment of the invention as noted above in a three phase motor is a preset amount which need not vary with the duty cycle of the PWM signals. In addition, the offset may be applied over the full range of possible duty cycles of PWM signals. Further, using a preset offset can allow sensing of current during up to 100% of the PWM cycles. In contrast, many prior art sensing methods are restricted to less than 100% to allow time for the A/D converter 110 to sample the analog current sensor output.

As a result, embodiments of the invention offset the timing of the three phase PWM signals so that the current in each of the three phases of the motor 102 can be determined from the single current sensor 104. This reduces the cost of the drive and its physical size compared to some embodiments because it employs one current sensor instead of three current sensors and because of reduced requirements for the A/D converter 110 and the input amplifier. Furthermore, it allows for multiple current readings per phase per PWM cycle. In addition, in certain motors and certain commutation schemes, offsetting the PWM signals by 120 degrees or some other offset according to embodiments of the invention may reduce audible noise generated. In contrast, prior art motor drives which sensed current in each phase have higher costs. Prior art single sensor methods may also require more processing power to calculate variations in offsets with changing PWM duty cycles.

As an alternative, the A/D converter 110 may be programmed to sample the analog signal from sensor 104 at fixed points with respect to the PWM signals and/or the controller 112 may be programmed to only receive and process digital current signals from the A/D converter 110 at fixed points with respect to the PWM signals. As some examples, the fixed point may be a time (degrees) in the PWM cycle or a relative fixed point such as the leading or trailing edge or center of the PWM pulse, or at a minimum or maximum of the PWM signals.

Thus, in summary, in one embodiment, an apparatus 100 supplies current from a power source (e.g., ac source 107 and converter 106) to each phase A, B, C of a three-phase motor 102. A switching array or other inverter 108 interconnects the power source and each phase of the three-phase motor 102. A current sensor 104 senses current supplied from the power source via the switching array to the motor and a controller 112 responsive to the sensor 104 generates pulse width modulated (PWM) signals for controlling the switching array to supply power to each of the phases of the motor. The phase of the PWM signals (e.g., the leading edge, the trail edge or the center of each pulse) supplied by the controller 112 to the switching array to supply power to one of the phases is offset a preset amount from the PWM signals supplied by the controller to the switching array to supply power to at least one of the other phases. In one embodiment, the offset between each of the three phases is approximately 120 degrees. In one embodiment, the current sensor comprises a single current sensor for sensing current supplied to a bus which supplies power to the switching array (e.g., the motor drive).

In summary, in one embodiment, the invention comprises an apparatus 100 for supplying current from a power source 107 to first, second and third phases A, B, C of a motor 102. A first switching array Q1 and Q2 interconnects the power source 107 and the first phase A of the motor 102. A second switching array Q3 and Q4 interconnects the power source 107 and the second phase B of the motor 102. A third switching array Q5 and Q6 interconnects the power source 107 and the third phase C of the motor 102. A current sensor 104 senses current supplied by the power source 107 to the switching arrays. A controller 112 generates first PWM signals for controlling the first switching array to supply power to the first phase A of the motor 102, generates second PWM signals for controlling the second switching array to supply power to the second phase B of the motor 102, and generates third PWM signals for controlling the third switching array to supply power to the third phase C of the motor 102. The phase of the first PWM signals supplied by the controller 112 are offset a preset amount from at least one of the phases of the second and third PWM signals.

In one embodiment, the invention comprises a motor 102 including a switching array 108 for interconnecting a power source 107 to each phase A, B, C of a three-phase winding. A current sensor 104 senses current supplied from the power source 107 via the switching array 108 to the winding A, B, C. A controller 112 generates PWM signals for controlling the switching array 108 to supply power to each of the phases A, B, C of the winding, wherein the PWM signals supplied by the controller 112 to the switching array 108 to supply power to one of the phases is offset a preset amount from the PWM signals supplied by the controller 112 to the switching array to supply power to at least one of the other phases.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An apparatus for supplying current from a power source to each phase of a multi-phase motor comprising:
   a switching array interconnecting the power source and each phase of the multi-phase motor;
   a current sensor for sensing current supplied from the power source via the switching array to the motor; and
   a controller for generating pulse width modulated (PWM) signals for controlling the switching array to supply power to each of the phases of the motor, wherein the PWM signals supplied by the controller to the switching array to supply power to each of the phases is offset a preset amount from the PWM signals supplied by the controller to the switching array to supply power to the other phases.

2. The apparatus of claim 1 wherein the motor is a three phase motor and wherein the offset between each of the three phases is approximately 120 degrees.

3. The apparatus of claim 1 wherein the current sensor comprises a single current sensor for sensing current supplied to the switching array.

4. The apparatus of claim 1 further comprising an A/D converter converting an analog signal from the current sensor into a digital signal supplied to the controller, said A/D converter sampling the analog signal at a sampling rate which is in synchronization with a frequency of the PWM signals.

5. The apparatus of claim 1 further comprising an A/D converter converting an analog signal from the current sensor into a digital signal supplied to the controller, said A/D converter sampling the analog signal at a sampling rate which is independent of a frequency of the PWM signals.

6. The apparatus of claim 1 further comprising an A/D converter converting an analog signal from the current sensor into a digital signal supplied to the controller, said A/D converter sampling the analog signal at fixed points with respect to the PWM signals.

7. The apparatus of claim 6 wherein said A/D converter samples the analog signals at or as a function of a leading edge, a trailing edge or a center of each of the PWM signals.

8. An apparatus for supplying current from a power source to first, second and third phases of a motor comprising:
   A first switching array interconnecting the power source and the first phase of the motor;
   A second switching array interconnecting the power source and the second phase of the motor;
   A third switching array interconnecting the power source and the third phase of the motor;
   a current sensor for sensing current supplied by the power source to the switching arrays; and
   a controller for generating first PWM signals for controlling the first switching array to supply power to the first phase of the motor, generating second PWM signals for controlling the second switching array to supply power to the second phase of the motor, generating third PWM signals for controlling the third switching array to supply power to the third phase of the motor, wherein each of the PWM signals supplied by the controller to each switching array are offset a preset amount from the PWM signals supplied by the controller to other switching arrays.

9. The apparatus of claim 8 wherein the motor is a three phase motor and wherein the offset between each of the three phases is approximately 120 degrees.

10. The apparatus of claim 8 wherein the current sensor comprises a single current sensor for sensing current supplied to the switching array.

11. The apparatus of claim 8 further comprising an A/D converter converting an analog signal from the current sensor into a digital signal supplied to the controller, said A/D converter sampling the analog signal at a sampling rate which is in synchronization with a frequency of the PWM signals.

12. The apparatus of claim 8 further comprising an A/D converter converting an analog signal from the current sensor into a digital signal supplied to the controller, said A/D converter sampling the analog signal at a sampling rate which is independent of a frequency of the PWM signals.

13. The apparatus of claim 8 further comprising an A/D converter converting an analog signal from the current sensor into a digital signal supplied to the controller, said A/D converter sampling the analog signal at fixed points with respect to the PWM signals.

14. The apparatus of claim 13 wherein said A/D converter samples the analog signals at or as a function of a leading edge, a trailing edge or a center of each of the PWM signals.

15. A motor comprising:
   a multi-phase winding;
   a switching array for interconnecting a power source to each phase of the multi-phase winding;
   a current sensor for sensing current supplied from the power source via the switching array to the winding; and
   a controller for generating PWM signals for controlling the switching array to supply power to each of the phases of the winding, wherein the PWM signals supplied by the controller to the switching array to supply power to each of the phases is offset a preset amount from the PWM signals supplied by the controller to the switching array to supply power to the other phases.

16. The apparatus of claim 15 wherein the motor is a three phase motor and wherein the offset between each of the three phases is approximately 120 degrees.

17. The apparatus of claim 15 wherein the current sensor comprises a single current sensor for sensing current supplied to the switching array.

18. The apparatus of claim 15 further comprising an A/D converter converting an analog signal from the current sensor into a digital signal supplied to the controller, said A/D converter sampling the analog signal at a sampling rate which is in synchronization with a frequency of the PWM signals.

19. The apparatus of claim 15 further comprising an A/D converter converting an analog signal from the current sensor into a digital signal supplied to the controller, said A/D converter sampling the analog signal at a sampling rate which is independent of a frequency of the PWM signals.

20. The apparatus of claim 15 further comprising an A/D converter converting an analog signal from the current sensor into a digital signal supplied to the controller, said A/D converter sampling the analog signal at fixed points with respect to the PWM signals.

21. The apparatus of claim 20 wherein said A/D converter samples the analog signals at or as a function of a leading edge, a trailing edge or a center of each of the PWM signals.

* * * * *